TRACTOR SUPPORTED SPRAYING RIG

Filed March 3, 1950 5 Sheets-Sheet 1

INVENTOR.
Carl V. Carlson
BY Robert H. Wendt
Att'y

TRACTOR SUPPORTED SPRAYING RIG
Filed March 3, 1950 5 Sheets-Sheet 2
Fig. 2
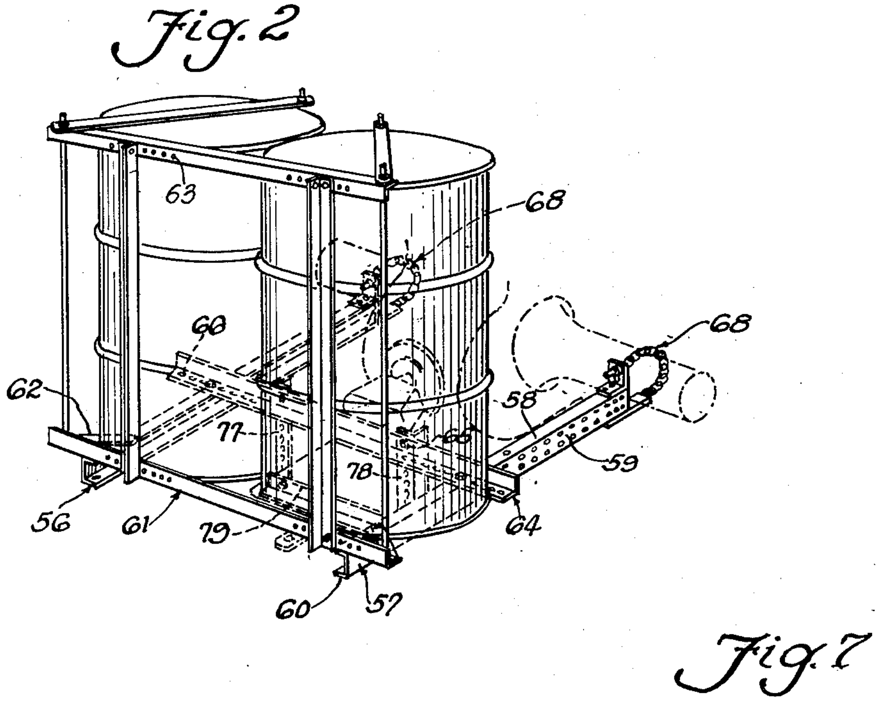
Fig. 7
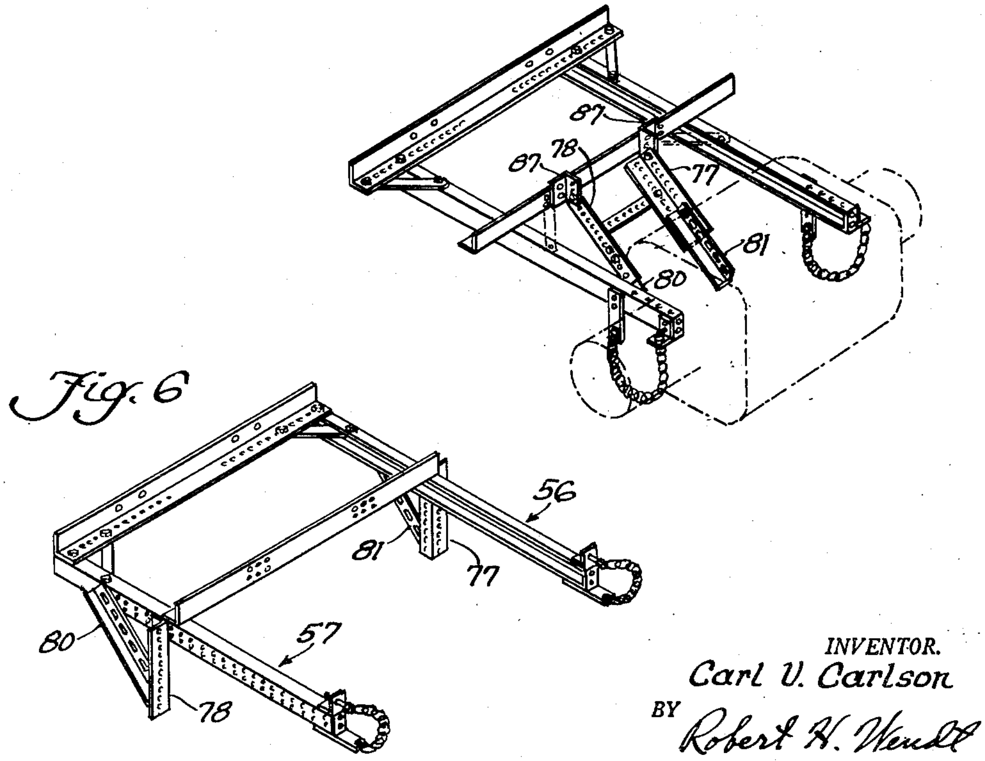
Fig. 7, Fig. 6
INVENTOR.
Carl V. Carlson
BY Robert H. Wendt
Att'y Nov. 18, 1952 C. V. CARLSON 2,618,509

TRACTOR SUPPORTED SPRAYING RIG

Filed March 3, 1950 5 Sheets-Sheet 3

INVENTOR.
Carl V. Carlson
BY Robert H. Wendt
Att'y

Nov. 18, 1952 C. V. CARLSON 2,618,509

TRACTOR SUPPORTED SPRAYING RIG

Filed March 3, 1950 5 Sheets-Sheet 4

INVENTOR.
Carl U. Carlson
BY Robert H. Wendt
Att'y

Nov. 18, 1952 C. V. CARLSON 2,618,509

TRACTOR SUPPORTED SPRAYING RIG

Filed March 3, 1950 5 Sheets-Sheet 5

INVENTOR.
Carl V. Carlson
BY Robert H. Wendt
Att'y

Patented Nov. 18, 1952

2,618,509

UNITED STATES PATENT OFFICE 2,618,509

TRACTOR SUPPORTED SPRAYING RIG

Carl V. Carlson, Wheaton, Ill., assignor, by mesne assignments, to Farmetl Equipment Company, Chicago, Ill., a copartnership Application March 3, 1950, Serial No. 147,534

21 Claims. (Cl. 299—30)

The present invention relates to tractor supporting rigs, and is particularly concerned with improved assemblies whereby spraying equipment including tanks, conducting boom, nozzles, hoses, pressure gauge, and pressure regulator, and stop cocks may be carried by tractors of various different manufacturers.

One of the objects of the invention is the provision of improved supporting assemblies by means of which one or two tanks and the associated equipment for a spraying rig can be attached to the rear end of a tractor and supported from the axle and draw-bar, with its pump connected to the power take-off in such manner that the liquid contents of the tank may be conveyed to an elongated tubular spraying boom carried by the supporting assembly, and provided with nozzles so that as the tractor progresses the liquid may be sprayed uniformly over an area as wide as the length of the boom, amplified by the field of the end nozzles.

Another object of the invention is the provision of an improved supporting assembly which is equally adaptable and attachable to light and heavy tractors, and which may be employed with one or two barrels and which may be attached to practically any of the tractors now on the market by variations in the mode of assembly of the parts.

Another object is the provision of an improved supporting assembly which may be supported directly by means of the axle and the draw-bar, or in case the draw-bar is not of suitable strength the assembly may be supported by the axle and the draw-bar at its point of attachment to the axle.

Another object is the provision of an improved spraying rig supporting assembly which is adjustable as to width, length of its main beams, length of its supporting struts, and which also has a final threaded adjustment for leveling the tanks in case the main supporting beams extend slightly downward or upward after having been adjusted as near as possible to the level position by using bolts in the nearest holes to this position.

A further object of the invention is the provision of a simple and sturdy construction for spraying rig assemblies, which provides maximum strength with the least possible weight, and in which the whole assembly can be dismounted from the tractor as a unit by backing the tractor up in such position that the spraying rig assembly is located above a suitable wooden supporting frame and then effecting the disconnection, and leaving the spraying rig assembly resting upon the wooden frame ready to be attached to the tractor again at any time.

Another object of the invention is the provision of an improved spraying rig assembly which is simple, capable of being manufactured at a low cost, adapted to be embodied in a trailer truck, and capable of being used for a long period of time without need for repair or replacement of any of its parts.

Other objects and advantages of the invention will be apparent from the following description and the accompanying drawings, in which similar characters of reference indicate similar parts throughout the several views.

Referring to the drawings, of which there are five sheets,

Fig. 2 is a view in perspective of the same form of the supporting framework shown apart from the tractor with the barrels, clamping bars and tie rods, and with the axle and draw-bar in phantom;

Fig. 6 is a view in perspective of another modification of the supporting framework;

Fig. 7 is a view in perspective of another modification of the supporting framework;

Figures 1, 3, 19:
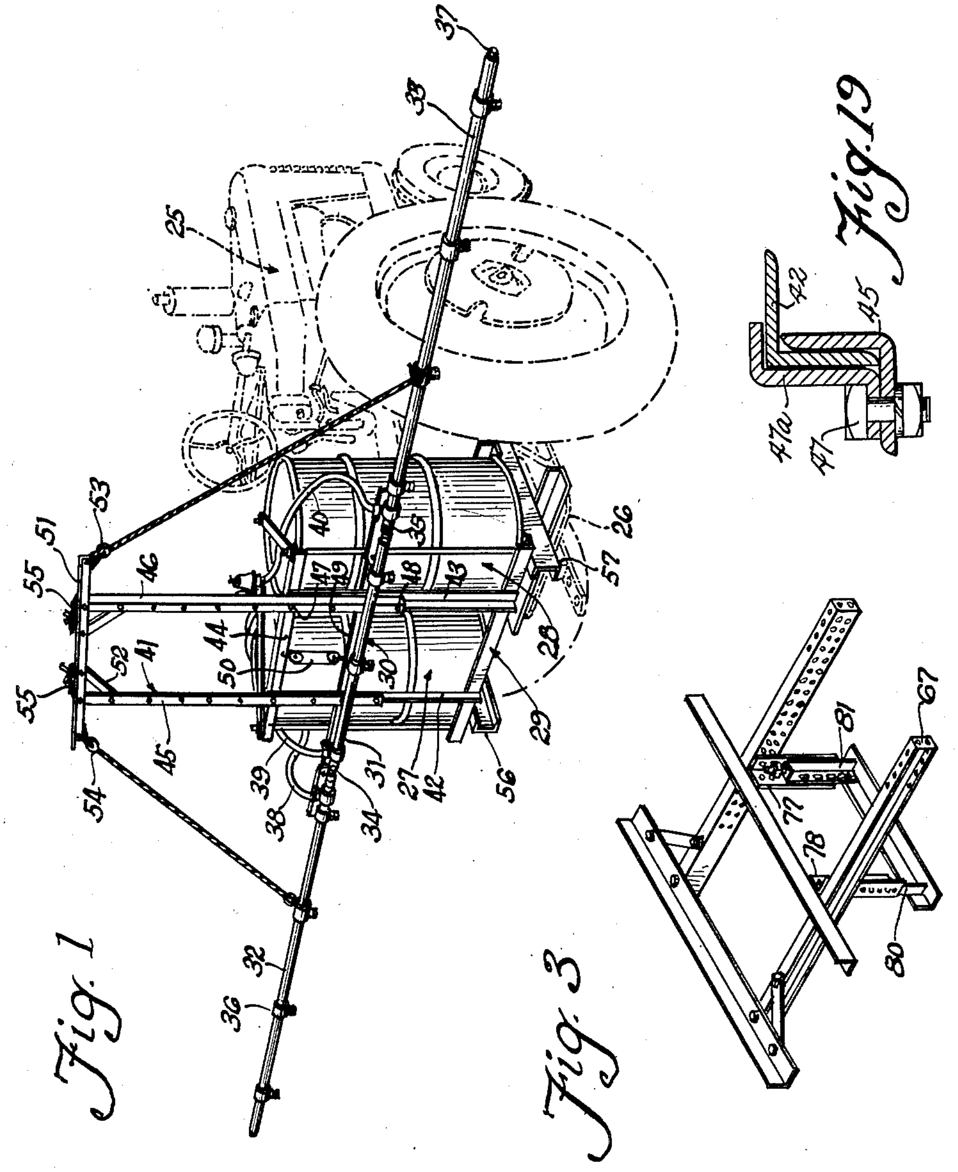
Fig. 1 is a view in perspective showing one of the present tractor supported spraying rigs attached to a tractor for use with the tractor shown in phantom.
Fig. 3 is a view in perspective of another modification of the supporting framework.

Fig. 19 is a larger fragmentary sectional view, showing the mode of attachment of the uprights 45 and 46 to the uprights 42 and 43 by means of bolts 47, 48.

Referring to Figure 1, 25 indicates in its entirety the tractor which is shown in phantom and which is provided with a draw-bar 26 at its rear end.

The spraying equipment which is to be carried by the tractor includes a pair of tanks 27, 28, supported upon a framework indicated in its entirety by the number 29. The framework also supports a spraying boom 30, which preferably comprises three sections, a central section 31, and two lateral sections 32, 33.

The central section 31 is carried by the framework 29, and is provided at its ends with vertical and horizontal hinges at 34, 35, for supporting the lateral sections 32, 33. The hinges with vertical axes permit the lateral sections 32, 33 to hinge backward when they strike any obstruction, such as a stump, tree or fence, while the hinges having horizontal axes permit the lateral boom sections 32, 33 to be lifted into a vertical position for clearing obstructions and passing through gates.

All three boom sections are provided with depending nozzles 36, at regularly spaced points, so that the entire boom is adapted to spray uniformly over a pattern as wide as the length of the boom and such additional space as the end nozzle may cover.

The boom is closed at its ends preferably with a removable plug 37, so that it may readily be removed for cleaning, and each boom section is supplied with liquid from a multiple pipe fitting having stop cocks for each flexible hose 38, 39, 40. The hoses are brought together at the multiple pipe fitting and stop cocks which are supplied with liquid pumped from the barrels by means of a pump connected to the power take-off of the tractor (not shown).

The boom is preferably adjustably mounted as to height by having the upper framework 41, which supports the boom slidably mounted upon the lower framework 29, as will be described. For example, the lower framework 29 preferably includes a pair of vertically extending angles 42, 43, which extend to the top of the barrels where they are secured in parallel position by a transverse angle 44, bolted to the vertical angle 43, and having one of its flanges extending over the top edge of the barrels.

The top framework 41 comprises a pair of elongated vertical angles 45, 46, spaced the same distance as the angles 42, 43, which they slidably engage and to which they are secured by a plurality of sliders, by means of bolts 47, near the top and bolts 48 near the bottom. Referring to Fig. 19, this is a sectional view of the slider and angle iron construction at the points 47 and 48. The frame members 42 and 43, which form part of the stationary frame, are engaged by the angles 45 and 46, respectively, and the bolts 47 on the frame members 45 secure Z-shaped sliders 47*a*, which confine the angle 42 to the angle 45, and the angle 43 to the angle 46. These sliders permit upward sliding movement of the upper framework on the angle irons 42 and 43.

The vertical angles 42, 43, and 45, 46, may be provided with suitable angle bracket guides to hold these channels in sliding engagement with each other for vertical movement. In other cases the guides may be eliminated and bolts may be used alone for securing these angles together.

Adjacent their lower ends the vertical frame members 45, 46, are joined by an angle 49, the horizontal flange of which is used to support the central boom section 31. A block and tackle 50 is secured to the angle iron 49 at its lower end, and to the upper frame member 44 at the top of the barrels, and may be used to raise and lower the boom while at the same time raising the upper framework 41.

At their upper ends the frame members 45, 46 are joined by a transverse cross head 51, formed of angle iron and provided with corner braces 52. Pulleys 53 are supported at each end of the cross head for the passage of ropes or cables 54, which have their lower ends secured to the lateral boom sections 32, 33 to pull these boom sections up into vertical positions and to support them in horizontal position.

The free end of the ropes or cables 54 may be attached to cleats 55 carried by the cross head. There are a great many different forms of tractors on the market made by the same or different manufacturers, and some are made in different sizes, and each manufacturer may have several models.

The present lower framework is adapted to be secured to practically all of the tractors now on the market, and for this purpose variations in the framework may be made according to the disclosures of Figures 2 to 7. For example, the drum supporting framework 29 includes a pair of rearwardly extending channels 56, 57, Figure 1.

Referring to Figure 2, the same channels are shown and each channel includes an upper horizontal flange 58, a vertical web 59 and a lower horizontal flange 60. The upper and lower webs are preferably provided with a plurality of through apertures adjacent each of their ends, such as, for example, four through apertures regularly spaced from each other and from the end of the channel.

At the rear end, that is the left end of the channels 56, 57 in Figure 2, these apertures are employed for supporting and for the securement by bolts of the lower transverse angle 61, which has its horizontal flange beneath the barrel or barrels, and has its vertical flange toward the rear of the barrels, thus confining the barrel against rearward movement and providing for its support.

One of the apertures in the top flange, Figure 2, may be employed for securing the brace 62, which tends to hold the framework rectangular and stiffens it laterally.

The rear angle iron 61 has a plurality of apertures 63 in its vertical flange, two of these being employed for the vertical frame members 42, 43 of Figure 1, and the apertures 63 are so located that these vertical frame members may be properly fitted for one barrel on one side, one barrel in the middle, or for two barrels.

The front bottom angle iron 64 may be somewhat similar in construction to that shown at 63, but it is preferably provided with a plurality of apertures 65 in its vertical flange for attachment to vertical supporting struts.

Both the angle frame members 61, 64 have their horizontal flanges provided with a multiplicity of regularly spaced apertures 66, which are used to pass bolts by means of which they are secured to the channels 56, 57, to fit various types of tractors.

The assembly may be made narrower or wider, depending upon the structure of the tractor axle to which it is to be secured and the other parts which it must clear.

The front lower frame member 64 supports the barrel or barrels with its horizontal flange and confines them against forward movement by means of its vertical flange; and both the frame members 61 and 64 are so located that they support the barrels, if there are two of them, behind the tractor seat. Where one barrel is employed it may sometimes be located beside the tractor seat.

At the forward end of the two channels 56, 57, these channels are closed by means of a welded end plate 67 welded to the top and bottom flange and web and provided with a pair of through apertures. These, with the apertures in the upper and lower flanges of the channels, are used for the chain attachment indicated in its entirety by the numeral 68, Figure 2.

This chain attachment assumes various different forms, depending upon the structure of the tractor, and five of the different forms of chain attachment are shown in Figures 11 to 15. For example, with certain tractors the chain 69 has its end link 70 welded to a metal plate 71, which is provided with a plurality of apertures.

Plate 71 may be bolted to the bottom flange 60 by the screw bolts and nuts 72, and the chain is long enough to extend around the axle housing, its free end being provided with a threaded eye bolt 73.

The shank of the threaded eye bolt 73 extends through a vertically extending elongated slot 74 in the angle bracket 75, where the nut and spring washer 76 provide a means for tightening the chain and assuring the nut against accidental rotation.

Angle bracket 75 has its horizontal flange secured to the top flange 58 of channel 57, by means of a pair of screw bolts and nuts.

Figure 11:
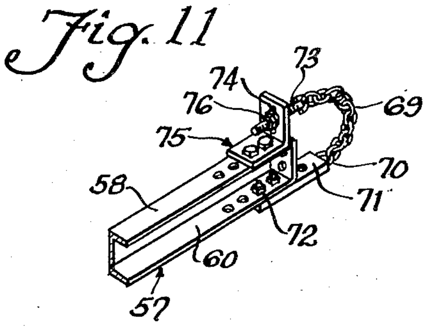
Fig. 11 is a view in perspective showing the right end of the drum supporting channel and one mode of its attachment to the axle, this being the same one employed in Figure 2.
Figure 12:
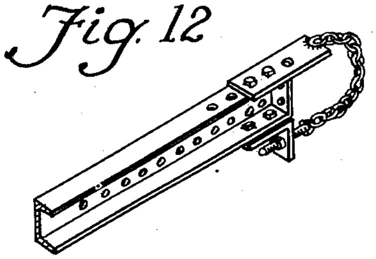
Fig. 12 is a similar view in perspective showing a modified mode of attachment to the axle.

Referring to Figure 12, in this case the assembly of Figure 11 has been inverted and is used for another type of tractor on which this arrangement fits most readily.

Figure 13:
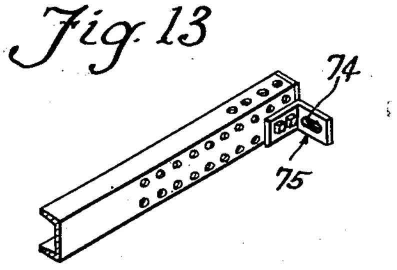
Fig. 13 is another view in perspective of another modified mode of attachment to the axle housing.

Referring to Figure 13, in this embodiment the chain has been eliminated and the web of the channel is bolted directly to one flange of the angle bracket 75, the other flange with the slot 74 being used to bolt the angle bracket directly to the axle housing, at a point where bolts are already employed.

Figure 14:
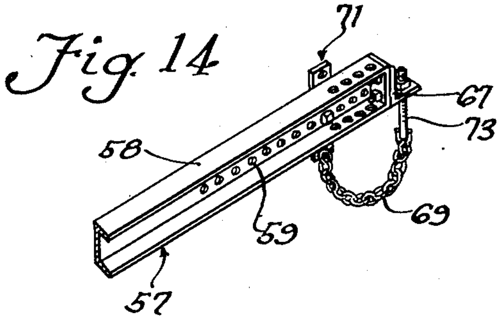
Fig. 14 is another view in perspective showing another modification of the attachment to the axle.

Referring to Figure 14, in this case the plate 71 has been bolted on the outside of the channel web 59, with the chain depending from it, and the eye bolt 73 extends through the slot 74 which has been arranged in horizontal position by securing the other flange of the angle bracket to the end wall 67.

Figure 15:
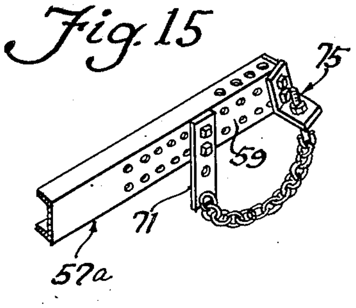
Fig. 15 is another view in perspective showing a further form of attachment for the drum supporting channel on the axle housing.

Referring to Figure 15, in this case the chain 69 depends from plate 71 and angle bracket 75, both of which have been secured by a pair of bolts and nuts in each case to the web 59 of channel 57*a*. It should be noted that in Figures 11, 12 and 13 the ends of the channels 56, 57 are arranged abutting the rear side of the axle housing, while in Figures 14 and 15 the forward end portions of the channels are resting on the axle housing and the chain depends about the axle housing.

These various modes of attachment are required to make the present framework attachable to practically any of the tractors now on the market.

Referring to Figure 2, the framework in that embodiment rests directly upon the draw-bar of the tractor and this form is employed when the draw-bar is itself strong enough to support the barrels and other equipment at a point adjacent the end of the draw-bar.

In this case the frame member 64 is secured to a pair of short vertically extending angles 77, 78, which are joined at the bottom by an angle 79, the horizontal flange of which rests directly upon the draw-bar at a point spaced from its attachment to the axle housing. In order to provide for the adjustability of the height of the framework, the angles 77, 78 have both their flanges provided with a multiplicity of regularly spaced apertures.

Referring to Figure 3, in this case the same channels 56, 57 and barrel supporting angles 61, 64 are employed in the same arrangement but the increased distance between the draw-bar and the framework requires the use of a pair of downwardly extending slotted angles 80, 81, each secured by a pair of bolts to the struts or angles 77, 78, the slots in angles 80, 81 being used for relatively small vertical adjustments.

Figure 16:
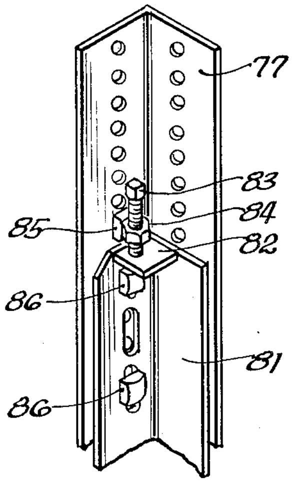
Fig. 16 is an enlarged view in perspective showing a final threaded adjusting structure for leveling the drum supporting channels such as that, for example, employed in Figure 3.

An approximate leveling is secured by selecting the proper slots and holes for the bolts, but the upper end of each channel 80, 81 is preferably constructed as shown in Figure 16, and an adjusting bolt and nut assembly is employed as shown in this figure. For example, the channel 81 may have a welded end flange 82 which serves as an abutment for the end of the threaded adjusting screw bolt 83.

This screw bolt passes through a nut 84, having one of its flat sides welded to the end surface of the head 85 of a screw bolt which has its shank passing through one of the holes in the channel 77. The hole for the shank of screw bolt 85 is suitably selected so that a fine vertical adjustment may be achieved by means of the screw bolt 83 bearing on end plate 82.

When the channels 56, 57 have been leveled by adjusting screw bolt 83, then the other transverse screw bolts 86 which secure the angles 77 and 81 together may be tightened, and the presence of the screw bolt 83 prevents any sliding of the screw bolts 86 in the slots.

Figures 4, 5, 8:
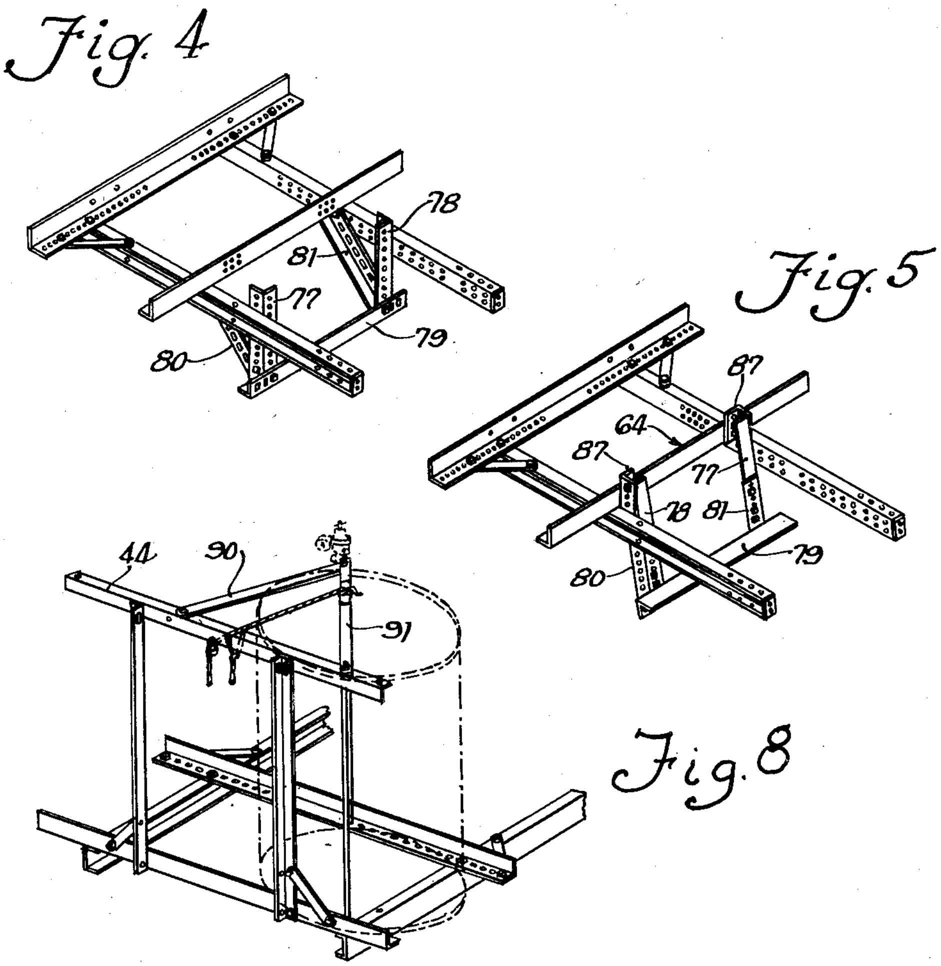
Fig. 4 is a view in perspective of another modification of the supporting framework.
Fig. 5 is a view in perspective of another modification of the supporting framework.
Fig. 8 is a view in perspective showing the construction of the upper part of the framework when a single barrel is employed on the right side.

Referring to Figure 4, in this modification of the supporting framework the draw-bar is not strong enough to support the weight of the assembly at its end and, therefore, the weight is brought to bear on the draw-bar at its point of attachment to the housing. In this case the lower transverse connecting angle 79 is again carried by the vertical struts 77, 78 which are secured to the webs of the channels 56, 57, immediately above the point of securement of the draw-bar to the axle housing.

The vertical angles 77, 78 are then preferably braced by using the slotted angles 80, 81 to extend diagonally upward and backward from the lower end of the angles 77, 78 to the webs of the channels 56, 57.

Referring to Figure 5, this attachment is suitable for securement to certain trucks such as the "Allis-Chalmers B or C." In this case the draw-bar is lower and the two angles 77 and 81 are secured together to provide a longer strut, and the same is true of angles 78 and 80.

The upper ends of angles 77 and 78 are secured to one flange of an angle bracket 87, which in turn is secured to the horizontal drum securing angle 64. At their lower ends the two elongated struts are secured to the same transverse frame member 79, with its horizontal flange uppermost, and the slots and the structure of Figure 17 are employed for securing a leveling adjustment.

Figures 17, 18:
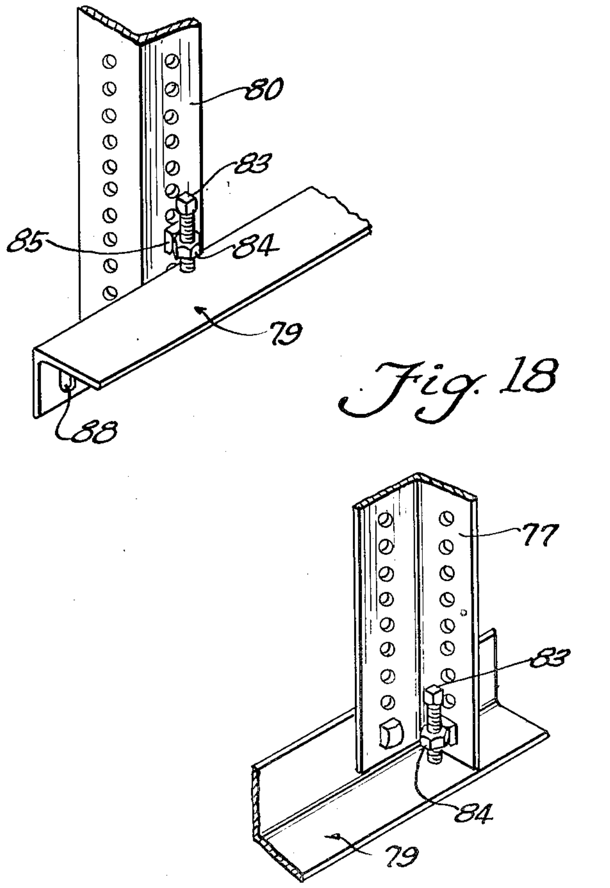
Fig. 17 is an enlarged view in perspective of another form of threaded adjustment for leveling the drum supporting channels, which is the form employed in Figure 5.
Fig. 18 is another enlarged view in perspective of a threaded leveling arrangement of the type employed in Figure 4.

Referring to Figure 17, the horizontal frame member 79 has its vertical flange provided with slots 88. When these are used with the holes in the angles 80, 81, the slots permit a sliding adjustment of the securing bolts.

Such a sliding adjustment might come loose and, therefore, the same screw bolt 83, nut 84 and supporting bolt 85 are employed with the screw bolt bearing on the horizontal flange of angle 79 to level the channels which support the barrels.

Referring to Figure 7, in this embodiment the arrangement is similar to Figure 5, except that the angle brackets 87 are reversed and the two elongated struts made up of frame members 78, 80 and 77, 81 are joined by a transverse strap 89 and have no lower transverse frame member. In this case the ends of frame members 80, 81 are directly bolted to existing bolts on the tractor assembly.

Referring to Figure 6, this is still another modification in which the tractor has such a wide draw-bar that the vertically extending angles 77, 78 may be carried by the webs of the channels 56, 57, and they are braced by the diagonally extending slotted angles 80, 81.

Referring to Figure 18, this shows another form of the adjusting screw 83, which is arranged at the bottom of a vertical angle 77 and bears against the horizontal flange of a lower frame member 79.

Figure 9:
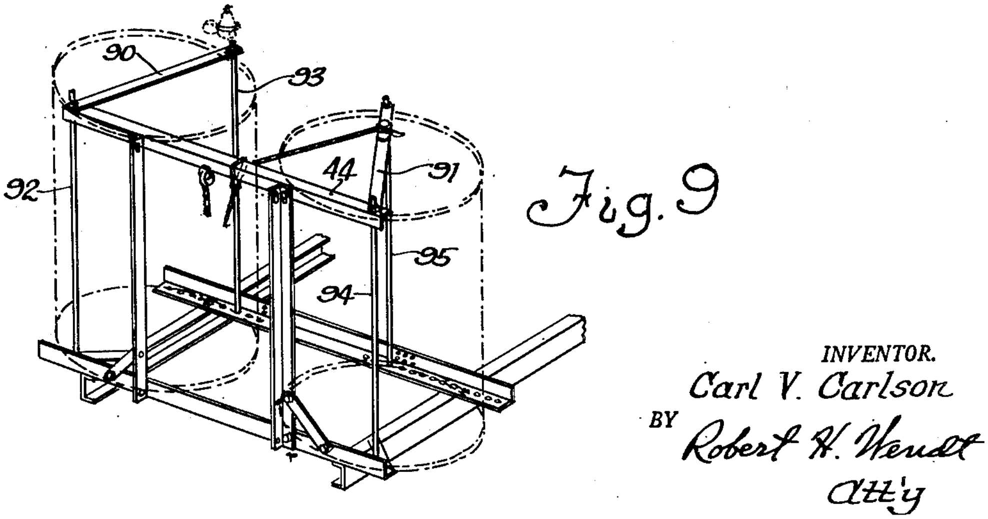
Fig. 9 is a view in perspective of the upper part of the framework showing its construction when two barrels are employed side by side.

The barrels which support the liquid to be sprayed are preferably metal barrels or drums which fit between the lower frame members 61, 64, in such manner that they are supported upon the horizontal flanges and engaged by the vertical flanges. The barrels are then clamped in position by providing transverse hold-down bars at the top, indicated at 90, 91, Figure 9, these bars being secured by tie rods 92—95.

Each of the hold-down bars has an aperture at its end for receiving a tie rod. The hold-down bars are long enough to extend across the full diameter of either barrel. At their rear ends the hold-down bars are secured to the top angle frame member 44 by having the tie rods pass through the hold-down bars and through the horizontal flange of the angle 44.

Each tie rod has a head on its lower end and at its lower end it passes through the horizontal flange of either of the frame members 61 or 64, as shown, being provided with a nut at its upper end above the hold-down bars 90, 91. Thus the tie rods 92—95 urge the hold-down bars into clamping engagement with the tops of the barrels and clamp the barrels down against the lower supporting angles 61, 64, preventing any lateral movement of the barrels which are preferably arranged symetrically.

The hold-down bars extend slightly diagonally so that the tie rods which are located outside the barrels may engage the horizontal flanges of the angles 61, 64. By extending diagonally the tie rods are located at a point where the barrel does not cover these horizontal flanges.

Figure 10:
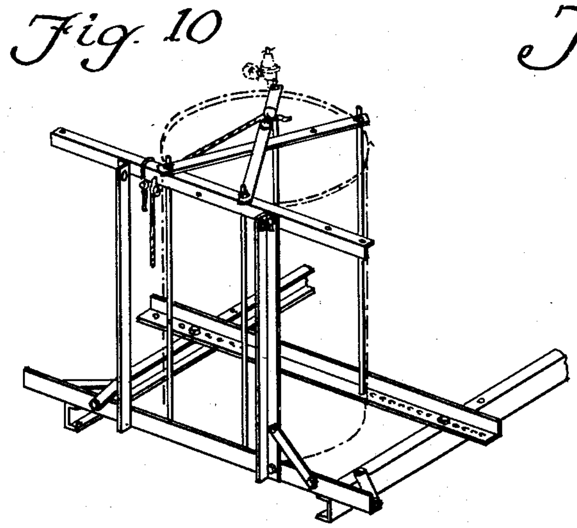
Fig. 10 is a similar view in perspective of the upper part of the framework when one barrel is employed and centrally located.

Referring to Figure 10, this shows the arrangement where a single barrel is employed and centrally located. In this case the two hold-down bars may be arranged crossing each other, bending sufficiently at the middle to permit this arrangement, and both being used in the same way to clamp down one barrel.

Referring to Figure 8, this shows the arrangement where a single barrel is employed and located at the right side, because the seat must otherwise be removed to make room for the second barrel.

There are a number of tractors where the seat is in the way of the second drum so that either the seat or one drum must be eliminated. In this case only one clamping bar 91 may be used, crossing the top of the barrel, while the other one 90 may be employed as a brace extending from the remote tie rod back to the upper frame member 44.

It will thus be observed that I have invented an improved supporting assembly for spray rigging which is adaptable for use on practically all of the tractors now on the market.

At its forward end the present framework is provided with means of attaching the barrel supporting channels to the axle housing. Below these channels the framework is provided with means for supporting the framework directly upon the end portion of the draw-bar, but in the case of tractors in which the draw-bar is not sufficiently strong the supporting struts go forward to the point of attachment between the draw-bar and the axle housing, or are secured directly to the axle housing. Where light tractors are employed the number of barrels carried should be cut down to one, so that there will be no danger of the weight of the barrel tending to lift the front wheels.

The present spray installation permits the lateral sections of the booms to be lifted to vertical position when passing through gates or to be lifted as required to pass obstructions. It also permits the lateral sections of the booms to swing backward on a vertical hinge pintle when they engage obstructions, but being supported by the diagonal extending ropes of fixed length, the boom sections tend to rise as they hinge backward and to pass over the obstructions, after which they immediately swing back to the horizontal position.

The present spraying rig sprays liquids over a uniform pattern with full coverage over all areas which the boom passes. When the spraying equipment is no longer to be used the tractor may be backed up to a platform which passes under the present framework, and the spraying rig may be released by releasing the chains or other fastening means that secure it to the axle housing.

The spraying rig may then be permitted to stand on such a wooden platform against a wall where it is out of the way but ready to be reattached as a unit to the tractor by merely backing up the tractor into proper position and securing the chains or other securing devices.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a unitary farm spraying equipment for quick attachment to a farm tractor having a draw bar and an axle housing, the combination of a pair of longitudinally extending metal frame members provided at their forward ends with means for attachment to the axle housing of the tractor, the said longiudinally extending metal frame members being joined at their rear ends by a pair of transversely extending angles arranged with a horizontal flange on the longitudinal members, to be placed under one or more barrels, and with the vertical flanges of the angles located to prevent forward or rearward movement of a barrel, forming a rigid rectangular framework, and means carried by said framework, for supporting it in horizontal position on the tractor by engaging the draw bar, the said means for attachment of the longitudinal frame members to the axle housing comprising a flexible chain having one end fixedly secured to the longitudinal frame member, and having the other end provided with an eye bolt and a nut, the eye bolt passing through an aperture in a part carried by the longitudinal frame member, to take up the chain and tighten it about the axle housing.

2. In a unitary farm spraying equipment for quick attachment to a farm tractor having a draw bar and an axle housing, the combination of a pair of longitudinally extending metal frame members provided at their forward ends with means for attachment to the axle housing of the tractor, the said longitudinally extending metal frame members being joined at their rear ends by a pair of transversely extending angles arranged with a horizontal flange on the longitudinal members, to be placed under one or more barrels, and with the vertical flanges of the angles located to prevent forward or rearward movement of a barrel, forming a rigid rectangular framework, and means carried by said framework, for supporting it in horizontal position on the tractor by engaging the draw bar, the said means for attachment of the longitudinal frame members to the axle housing comprising a flexible chain having one end fixedly secured to the longitudinal frame member, and having the other end provided wtih an eye bolt and a nut, the eye bolt passing through an aperture in a part carried by the longitudinal frame member, to take up the chain and tighten it about the axle housing, the said part comprising an angle bracket secured to the said longitudinal frame member, and the other end of the chain being fixedly secured to an attachment plate having a plurality of apertures.

3. In a unitary farm spraying equipment for quick attachment to a farm tractor having a draw bar and an axle housing, the combination of a pair of longitudinally extending metal frame members provided at their forward ends with means for attachment to the axle housing of the tractor, the said longitudinally extending metal frame members being joined at their rear ends by a pair of transversely extending angles arranged with a horizontal flange on the longitudinal members, to be placed under one or more barrels, and with the vertical flanges of the angles located to prevent forward or rearward movement of a barrel, forming a rigid rectangular framework, and means carried by said framework, for supporting it in horizontal position on the tractor by engaging the draw bar, the said means for attachment of the longitudinal frame members to the axle housing comprising a flexible chain having one end fixedly secured to the longitudinal frame member, and having the other end provided with an eye bolt and a nut, the eye bolt passing through an aperture in a part carried by the longitudinal frame member, to take up the chain and tighten it about the axle housing, the said part comprising an angle bracket secured to the said longitudinal frame member, and the other end of the chain being fixedly secured to an attachment plate having a plurality of apertures, the said longitudinally extending frame member being provided with an end plate welded thereto, to abut against the axle housing, and having a multiplicity of apertures in said longitudinal frame member, for securement of the angle bracket and the said plate by means of through bolts.

4. In a unitary farm spraying equipment for quick attachment to a farm tractor having a draw bar and an axle housing, the combination of a pair of longitudinally extending metal frame members provided at their forward ends with means for attachment to the axle housing of the tractor, the said longitudinally extending metal frame members being joined at their rear ends by a pair of transversely extending angles arranged with a horizontal flange on the longitudinal members, to be placed under one or more barrels, and with the vertical flanges of the angles located to prevent forward or rearward movement of a barrel, forming a rigid rectangular framework, and means carried by said framework, for supporting it in horizontal position on the tractor by engaging the draw bar, the said means for attachment of the longitudinal frame members to the axle housing comprising a flexible chain having one end fixedly secured to the longitudinal frame member, and having the other end provided with an eye bolt and a nut, the eye bolt passing through an aperture in a part carried by the longitudinal frame member, to take up the chain and tighten it about the axle housing, the said means for supporting the framework upon the draw bar comprising a substantially rectangular depending frame of angles having a lowermost angle engaging the draw bar.

5. In a unitary farm spraying equipment for quick attachment to a farm tractor having a draw bar and an axle housing, the combination of a pair of longitudinally extending metal frame members provided at their forward ends with means for attachment to the axle housing of the tractor, the said longitudinally extending metal frame members being joined at their rear ends by a pair of transversely extending angles arranged with a horizontal flange on the longitudinal members, to be placed under one or more barrels, and with the vertical flanges of the angles located to prevent forward or rearward movement of a barrel, forming a rigid rectangular framework, and means carried by said framework, for supporting it in horizontal position on the tractor by engaging the draw bar, the said framework having a pair of upwardly extending frame members at the rear end thereof of sufficient height to extend to the top of one of said barrels, a transverse angle iron carried by said upwardly extending frame members and having one of its flanges arranged to engage the top of the barrel, and tie rods extending through the horizontal flanges of angle irons above and below the barrel, to draw them together and to clamp the barrel.

6. In a unitary farm spraying equipment for quick attachment to a farm tractor having a draw bar and an axle housing, the combination of a pair of longitudinally extending metal frame members provided at their forward ends with means for attachment to the axle housing of the tractor, the said longitudinally extending metal frame members being joined at their rear ends by a pair of transversely extending angles arranged with a horizontal flange on the longitudinal members, to be placed under one or more barrels, and with the vertical flanges of the angles located to prevent forward or rearward movement of a barrel, forming a rigid rectangular framework, and means carried by said framework, for supporting it in horizontal position on the tractor by engaging the draw bar, the said framework having a pair of upwardly extending frame members at the rear end thereof of sufficient height to extend to the top of one of said barrels, a transverse angle iron carried by said upwardly extending frame members and having one of its flanges arranged to engage the top of the barrel, and tie rods extending through the horizontal flanges of angle irons above and below the barrel, to draw them together and to clamp the barrel, said tie rods being secured at their upper ends to a clamping bar which extends across the top of said barrel, to hold the barrel down against the framework.

7. In a unitary farm spraying equipment for quick attachment to a farm tractor having a draw bar and an axle housing, the combination of a pair of longitudinally extending metal frame members provided at their forward ends with means for attachment to the axle housing of the tractor, the said longitudinally extending metal frame members being joined at their rear ends by a pair of transversely extending angles arranged with a horizontal flange on the longitudinal members, to be placed under one or more barrels, and with the vertical flanges of the angles located to prevent forward or rearward movement of a barrel, forming a rigid rectangular framework, and means carried by said framework, for supporting it in horizontal position on the tractor by engaging the draw bar, said framework being provided with means for clamping a pair of barrels to the framework, a pair of vertically extending frame members rearwardly of said barrels, a transversely extending frame member at the top of the barrels, and a pair of metal barrels clamped between said upper transversely extending frame member and the lower angles which support the barrels.

8. In a unitary farm spraying equipment for quick attachment to a farm tractor having a draw bar and an axle housing, the combination of a pair of longitudinally extending metal frame members provided at their forward ends with means for attachment to the axle housing of the tractor, the said longitudinally extending metal frame members being joined at their rear ends by a pair of transversely extending angles arranged with a horizontal flange on the longitudinal members, to be placed under one or more barrels, and with the vertical flanges of the angles located to prevent forward or rearward movement of a barrel, forming a rigid rectangular framework, and means carried by said framework, for supporting it in horizontal position on the tractor by engaging the draw bar, said framework being provided with means for clamping a pair of barrels to the framework, a pair of vertically extending frame members rearwardly of said barrels, a transversely extending frame member at the top of the barrels, and a pair of metal barrels clamped between said upper transversely extending frame member and the lower angles which support the barrels, and a transversely extending boom having a middle section and two lateral sections pivotally mounted on the middle section, for movement on a horizontal axis or a vertical axis.

9. In a unitary farm spraying equipment for quick attachment to a farm tractor having a draw bar and an axle housing, the combination of a pair of longitudinally extending metal frame members provided at their forward ends with means for attachment to the axle housing of the tractor, the said longitudinally extending metal frame members being joined at their rear ends by a pair of transversely extending angles arranged with a horizontal flange on the longitudinal members, to be placed under one or more barrels, and with the vertical flanges of the angles located to prevent forward or rearward movement of a barrel, forming a rigid rectangular framework, and means carried by said framework, for supporting it in horizontal position on the tractor by engaging the draw bar, said framework being provided with means for clamping a pair of barrels to the framework, a pair of vertically extending frame members rearwardly of said barrels, a transversely extending frame member at the top of the barrels, and a pair of metal barrels clamped between said upper transversely extending frame member and the lower angles which support the barrels, and a transversely extending boom having a middle section and two lateral sections pivotally mounted on the middle section, for movement on a horizontal axis or a vertical axis, an upwardly extending rear framework provided with pulleys and tension members, the tension members having their ends secured to said lateral boom sections, to pull them to vertical position or to lift them over obstructions.

10. In a tractor supported farm spraying unit, the combination of a tractor having a rear axle housing and a draw bar carried thereby and projecting rearwardly from the lower part of the axle housing, with a quickly removable unit comprising a pair of channelled metal members, each channelled metal member being provided with a multiplicity of holes in its web and in its laterally projecting upper and lower flanges, a chain carried by the forward end of each channelled member, and having one end secured thereto, with the other end passing about the axle housing, and provided with an eye bolt, said eye bolt passing through an angle bracket carried by each channelled member, and having a tightening nut for drawing the chain tight about the axle housing, a pair of supporting struts of angle iron carried by the channelled members and depending therefrom into engagement with a part of the draw bar, to support the channelled members in approximately level position, and a pair of transverse angle irons arranged on top of said channelled members and secured to the top flanges thereof, one flange extending upwardly to engage the sides of a barrel, and the other flange extending horizontally to support the bottom of a barrel.

11. In a tractor supported farm spraying unit, the combination of a tractor having a rear axle housing and a draw bar carried thereby and projecting rearwardly from the lower part of the axle housing, with a quickly removable unit comprising a pair of channelled metal members, each channelled metal member being provided with a multiplicity of holes in its web and in its laterally projecting upper and lower flanges, a chain carried by the forward end of each channelled member, and having one end secured thereto, with the other end passing about the axle housing, and provided with an eye bolt, said eye bolt passing through an angle bracket carried by each channelled member, and having a tightening nut for drawing the chain tight about the axle housing, a pair of supporting struts of angle iron carried by the channelled members and depending therefrom into engagement with a part of the draw bar, to support the channelled members in approximately level position, and a pair of transverse angle irons arranged on top of said channelled members and secured to the top flanges thereof, one flange extending upwardly to engage the sides of a barrel, and the other flange extending horizontally to support the bottom of a barrel, the said depending angles being provided with a transversely extending angle member secured thereto for engaging the draw bar, and the said angles having a multiplicity of apertures for adjustment of the height of the channelled members above the draw bar, by selection of the proper apertures.

12. In a tractor supported farm spraying unit, the combination of a tractor having a rear axle housing and a draw bar carried thereby and projecting rearwardly from the lower part of the axle housing, with a quickly removable unit comprising a pair of channelled metal members, each channelled metal member being provided with a multiplicity of holes in its web and in its laterally projecting upper and lower flanges, a chain carried by the forward end of each channelled member, and having one end secured thereto, with the other end passing about the axle housing, and provided with an eye bolt, said eye bolt passing through an angle bracket carried by each channelled member, and having a tightening nut for drawing the chain tight about the axle housing, a pair of supporting struts of angle iron carried by the channelled members and depending therefrom into engagement with a part of the draw bar, to support the channelled members in approximately level position, and a pair of transverse angle irons arranged on top of said channelled members and secured to the top flanges thereof one flange extending upwardly to engage the sides of a barrel, and the other flange extending horizontally to support the bottom of a barrel, the said depending angles being provided with a transversely extending angle member secured thereto for engaging the draw bar, and the said angles having a multiplicity of apertures for adjustment of the height of the channelled members above the draw bar, by selection of the proper apertures, certain of said apertures being elongated for sliding movement on securing bolts, and bolts passing through said apertures for securement with nuts, and a pair of threaded adjustment members carried by said depending angles, each adjustment member comprising a bolt passing through an aperture in said angles, and having a nut welded to its head above said transversely extending angle, there being a set screw passing through said nut and engaging said transversely extending angle, for fine adjustment of the vertically extending angles, to level the channelled members.

13. In a tractor supported farm spraying unit, the combination of a tractor having a rear axle housing and a draw bar carried thereby and projecting rearwardly from the lower part of the axle housing, with a quickly removable unit comprising a pair of channelled metal members, each channelled metal member being provided with a multiplicity of holes in its web and in its laterally projecting upper and lower flanges, a chain carried by the forward end of each channelled member, and having one end secured thereto, with the other end passing about the axle housing, and provided with an eye bolt, said eye bolt passing through an angle bracket carried by each channelled member, and having a tightening nut for drawing the chain tight about the axle housing, a pair of supporting struts of angle iron carried by the channelled members and depending therefrom into engagement with a part of the draw bar, to support the channelled members in approximately level position, and a pair of transverse angle irons arranged on top of said channelled members and secured to the top flanges thereof, one flange extending upwardly to engage the sides of a barrel, and the other flange extending horizontally to support the bottom of a barrel, the said depending angles being provided with a transversely extending angle member secured thereto for engaging the draw bar, and the said angles having a multiplicity of apertures for adjustment of the height of the channelled members above the draw bar, by selection of the proper apertures, and the said depending angle members extending diagonally, to bring said transverse angle into engagement with the draw bar approximately at the point of its attachment to the axle housing.

14. In a tractor supported farm spraying unit, the combination of a tractor having a rear axle housing and a draw bar carried thereby and projecting rearwardly from the lower part of the axle housing, with a quickly removable unit comprising a pair of channelled metal members, each channelled metal member being provided with a multiplicity of holes in its web and in its laterally projecting upper and lower flanges, a chain carried by the forward end of each channelled member, and having one end secured thereto, with the other end passing about the axle housing, and provided with an eye bolt, said eye bolt passing through an angle bracket carried by each channelled member, and having a tightening nut for drawing the chain tight about the axle housing, a pair of supporting struts of angle iron carried by the channelled members and depending therefrom into engagement with a part of the draw bar, to support the channelled members in approximately level position, and a pair of transverse angle irons arranged on top of said channelled members and secured to the top flanges thereof, one flange extending upwardly to engage the sides of a barrel, and the other flange extending horizontally to support the bottom of a barrel, a pair of vertically extending angles carried by the rear one of said transversely extending angles, a transversely extending angle carried by said vertical angles, and having a horizontal flange located to engage the top of a barrel, and a metal barrel secured between said latter transversely extending angles and the two transversely extending angles on top of the channels and the barrel effecting a bracing of the structure by holding it in rectangular form.

15. In a tractor supported farm spraying unit, the combination of a tractor having a rear axle housing and a draw bar carried thereby and projecting rearwardly from the lower part of the axle housing, with a quickly removable unit comprising a pair of channelled metal members, each channelled metal member being provided with a multiplicity of holes in its web and in its laterally projecting upper and lower flanges, a chain carried by the forward end of each channelled member, and having one end secured thereto, with the other end passing about the axle housing, and provided with an eye bolt, said eye bolt passing through an angle bracket carried by each channelled member, and having a tightening nut for drawing the chain tight about the axle housing, a pair of supporting struts of angle iron carried by the channelled members and depending therefrom into engagement with a part of the draw bar, to support the channelled members in approximately level position, and a pair of transverse angle irons arranged on top of said channelled members and secured to the top flanges thereof, one flange extending upwardly to engage the sides of a barrel, and the other flange extending horizontally to support the bottom of a barrel, a pair of vertically extending angles carried by the rear one of said transversely extending angles, a transversely extending angle carried by said vertical angles, and having a horizontal flange located to engage the top of barrel, and a metal barrel secured between said latter transversely extending angles and the two transversely extending angles on top of the channels and the barrel effecting a bracing of the structure by holding it in rectangular form, a clamping bar for engaging the top of the barrel, and tie rods passing through the clamping bar and through the transversely extending angles above and below the barrel, to clamp the clamping bar against the barrel and to clamp the barrel against the transverse angles.

16. In a tractor supported farm spraying unit, the combination of a tractor having a rear axle housing and a draw bar carried thereby and projecting rearwardly from the lower part of the axle housing, with a quickly removable unit comprising a pair of channelled metal members, each channelled metal member being provided with a multiplicity of holes in its web and in its laterally projecting upper and lower flanges, a chain carried by the forward end of each channelled member, and having one end secured thereto, with the other end passing about the axle housing, and provided with an eye bolt, said eye bolt passing through an angle bracket carried by each channelled member, and having a tightening nut for drawing the chain tight about the axle housing, a pair of supporting struts of angle iron carried by the channelled members and depending therefrom into engagement with a part of the draw bar, to support the channelled members in approximately level position, and a pair of transverse angle irons arranged on top of said channelled members and secured to the top flanges thereof, one flange extending upwardly to engage the sides of a barrel, and the other flange extending horizontally to support the bottom of a barrel, a pair of vertically extending angles carried by the rear one of said transversely extending angles, a transversely extending angle carried by said vertical angles, and having a horizontal flange located to engage the top of a barrel, and a metal barrel secured between said latter transversely extending angles and the two transversely extending angles on top of the channels and the barrel effecting a bracing of the structure by holding it in rectangular form, a clamping bar for engaging the top of the barrel, and tie rods passing through the clamping bar and through the transversely extending angles above and below the barrel, to clamp the clamping bar against the barrel and to clamp the barrel against the transverse angles, a substantially U-shaped member constructed of two vertical angles, and a top angle forming a cross head, said vertical angles being joined at the bottom by a horizontal angle, and a spraying boom conduit carried by said latter angle.

17. In a tractor supported farm spraying unit, the combination of a tractor having a rear axle housing and a draw bar carried thereby and projecting rearwardly from the lower part of the axle housing, with a quickly removable unit comprising a pair of channelled metal members, each channelled metal member being provided with a multiplicity of holes in its web and in its laterally projecting upper and lower flanges, a chain carried by the forward end of each channelled member, and having one end secured thereto, with the other end passing about the axle housing, and provided with an eye bolt, said eye bolt passing through an angle bracket carried by each channelled member, and having a tightening nut for drawing the chain tight about the axle housing, a pair of supporting struts of angle iron carried by the channelled members and depending therefrom into engagement with a part of the draw bar, to support the channelled members in approximate level position, and a pair of transverse angle irons arranged on top of said channelled members and secured to the top flanges thereof, one flange extending upwardly to engage the sides of a barrel, and the other flange extending horizontally to support the bottom of a barrel, a pair of vertically extending angles carried by the rear one of said transversely extending angles, a transversely extending angle carried by said vertical angles, and having a horizontal flange located to engage the top of a barrel, and a metal barrel secured between said latter transversely extending angles and the two transversely extending angles on top of the channels and the barrel effecting a bracing of the structure by holding it in rectangular form, a clamping bar for engaging the top of the barrel, and tie rods passing through the clamping bar and through the transversely extending angles above and below the barrel, to clamp the clamping bar against the barrel and to clamp the barrel against the transverse angles, a substantially U-shaped member constructed of two vertical angles, and a top angle forming a cross head, said vertical angles being joined at the bottom by a horizontal angle, and a spraying boom conduit carried by said latter angle, said boom conduit including a central section and two lateral sections, the lateral sections being pivotally mounted for vertical movement and pivotally mounted for horizontal movement, and tension means extending to the upper cross head, for supporting and lifting said lateral sections, the lateral sections pivoting backward when they strike an obstruction, and rising, due to the tension means, to pass over the obstruction.

18. In a spraying rig for tractors, the combination of a lower horizontal framework with a pair of metal barrels having their upper and lower edges in parallel planes, means for securing and supporting the horizontal framework on the rear end of a tractor, a vertical framework carried by the rear part of said horizontal framework, a second upper horizontal framework secured to the vertical framework and located above said barrels, and means for clamping said barrels between said upper and lower frameworks, the upper and lower barrel edges holding the vertical framework at right angles to the upper and lower frameworks, and the barrels constituting the sole bracing means for maintaining the vertical position of the vertical framework.

19. In a spraying rig for tractors, the combination of a lower horizontal framework with a pair of metal barrels having their upper and lower edges in parallel planes, means for securing and supporting the horizontal framework on the rear end of a tractor, a vertical framework carried by the rear part of said horizontal framework, a second upper horizontal framework secured to the vertical framework and located above said barrels, and means for clamping said barrels between said upper and lower framework, the upper and lower barrel edges holding the vertical framework at right angles to the upper and lower frameworks, and the barrels constituting the sole bracing means for maintaining the vertical position of the vertical framework, and a spraying boom carried by said vertical framework and extending laterally on both sides from the vertical framework.

20. In a spraying rig for tractors, the combination of a lower horizontal framework with a pair of metal barrels having their upper and lower edges in parallel planes, means for securing and supporting the horizontal framework on the rear end of a tractor, a vertical framework carried by the rear part of said horizontal framework, a second upper horizontal framework secured to the vertical framework and located above said barrels, and means for clamping said barrels between said upper and lower framework, the upper and lower barrel edges holding the vertical framework at right angles to the upper and lower frameworks, and the barrels constituting the sole bracing means for maintaining the vertical position of the vertical framework, and a spraying boom carried by said vertical framework and extending laterally on both sides from the vertical framework, a second vertical sliding framework guided on the first vertical framework and pivoted boom extensions movably carried by the second vertical framework for selective elevation by the driver.

21. In a spraying rig for tractors, the combination of a lower horizontal framework with a pair of metal barrels having their upper and lower edges in parallel planes, means for securing and supporting the horizontal framework on the rear end of a tractor, a vertical framework carried by the rear part of said horizontal framework, a second upper horizontal framework secured to the vertical framework and located above said barrels, and means for clamping said barrels between said upper and lower framework, the upper and lower barrel edges holding the vertical framework at right angles to the upper and lower frameworks, and the barrels constituting the sole bracing means for maintaining the vertical position of the vertical framework, and a spraying boom carried by said vertical framework and extending laterally on both sides from the vertical framework, a second vertical sliding framework guided on the first vertical framework and pivoted boom extensions movably carried by the second vertical framework for selective elevation by the driver, said pivoted boom extensions being suspended by tension members extending diagonally downward and outward, and the movable boom extensions pivoting backward and being lifted upward automatically by said tension members to clear obstructions, such as gate posts.

CARL V. CARLSON.

REFERENCES CITED

The following references are of record in the file of this patent:

UNITED STATES PATENTS

| Number | Name | Date |
|---|---|---|
| 1,452,639 | Holway | Apr. 24, 1923 |
| 1,498,715 | Benoist | June 24, 1924 |
| 1,500,394 | Kennedy | July 8, 1924 |
| 1,606,954 | Noen et al. | Nov. 16, 1926 |
| 1,823,101 | Hoffman | Sept. 15, 1931 |
| 2,221,433 | Pitner | Nov. 12, 1940 |
| 2,381,649 | Dalton | Aug. 8, 1945 |
| 2,549,129 | Pickett | Apr. 17, 1951 |
| 2,551,120 | Harrison | May 1, 1951 |